United States Patent [19]

Lewis

[11] Patent Number: 5,721,714
[45] Date of Patent: Feb. 24, 1998

[54] METHOD AND APPARATUS FOR CONTROLLING BIAS LEVELS IN A MAGNETO-OPTICAL RECORDING DEVICE

[75] Inventor: David E. Lewis, Black Forest, Colo.

[73] Assignee: Discovision Associates, Ivine, Calif.

[21] Appl. No.: 475,229

[22] Filed: Jun. 7, 1995

Related U.S. Application Data

[62] Division of Ser. No. 418,965, Apr. 7, 1995, Pat. No. 5,666,333.

[51] Int. Cl.$^6$ .................................................. G11B 11/00
[52] U.S. Cl. .................... 369/13; 360/59; 360/114
[58] Field of Search .................... 369/13, 126, 44.14, 369/44.11, 44.28, 215, 55, 53, 54, 100, 112, 116; 360/114, 59, 103, 124, 66, 60

[56] References Cited

U.S. PATENT DOCUMENTS

| | | | |
|---|---|---|---|
| 5,163,032 | 11/1992 | Van Nieuwland et al. | 369/13 |
| 5,172,364 | 12/1992 | Yoshimoto et al. | 369/100 |
| 5,179,544 | 1/1993 | Hezemans et al. | 369/13 |
| 5,191,562 | 3/1993 | Hensing et al. | 369/13 |
| 5,392,273 | 2/1995 | Masaki et al. | 369/106 |
| 5,481,510 | 1/1996 | Masaki et al. | 369/32 |
| 5,485,435 | 1/1996 | Matsuda et al. | 369/13 |

FOREIGN PATENT DOCUMENTS

| | | |
|---|---|---|
| 0345877 | 12/1989 | European Pat. Off. . |
| 0352099 | 1/1990 | European Pat. Off. . |
| 0417858 | 3/1991 | European Pat. Off. . |
| 0556074 | 8/1993 | European Pat. Off. . |
| 0559469 | 9/1993 | European Pat. Off. . |
| 0576245 | 12/1993 | European Pat. Off. . |
| 90/05980 | 5/1990 | WIPO . |

*Primary Examiner*—Ali Neyzari
*Attorney, Agent, or Firm*—Ronald J. Clark; Robert T. Braun; Paul M. Thyfault

[57] ABSTRACT

An apparatus for controlling a magnetic field strength of a bias coil at a focal point of a lens during recording on a medium. The apparatus includes a first controller for determining a distance between the focal point of a lens and a reference point on the recording media. A source generates a stray magnetic field having a stray field strength at the focal point. A second controller calculates a digital signal which is a function of the distance and the stray field strength. A digital-to-analog converter converts the digital signal to a driver voltage and passes the driver voltage to a current driver, which drives the bias coil. The magnetic field strength of the bias coil is thereby controlled at a predetermined value. A method is also shown for controlling the strength of a magnetic field, including the steps of determining a distance between the focal point of a lens and a reference point on the recording media, generating a stray magnetic field strength at the focal point, calculating a digital signal which is a function of the distance and stray magnetic field, converting the digital signal to a driver voltage, and applying the driver voltage to a current driver to provide a bias current to the bias coil, thereby controlling the magnetic field strength at a predetermined value.

8 Claims, 6 Drawing Sheets

METHOD AND APPARATUS FOR CONTROLLING BIAS LEVELS IN A MAGNETO-OPTICAL RECORDING DEVICE

This is a division of application Ser. No. 08/418,965, filed Apr. 7, 1995, now U.S. Pat. No. 5,666,333.

FIELD OF THE INVENTION

The invention relates to magneto-optical information storage systems, and in particular to controlling magnetic bias of a bias coil in magneto-optical information storage systems.

DESCRIPTION OF THE BACKGROUND ART

In magneto-optical drives, a magnetic field of a minimum strength is required at the focal point of an objective lens in order to perform the operations of writing or erasing data. The magnetic field was created by passing constant current through bias coils of finite length, thus creating non-uniform magnetic fields. This non-uniformity leads to a problem. First, if a magnetic field was created allowing writing or erasing data at all positions of the focal point, excess power was dissipated. Second, if excess power was minimized, there would be positions of the focal point where the magnetic field was insufficient to allow writing or erasing data.

Furthermore, the bias coil was not the only source of magnetic fields at the focal point of the objective lens. Other sources existed, such as the focus actuator and the spindle motor. Because prior art systems used a constant current, sources which created uniform magnetic fields could be accounted for. However, non-uniform magnetic fields could not be accounted for accurately, leading to the same problems listed above.

SUMMARY OF THE INVENTION

There is disclosed an apparatus for controlling the strength of a magnetic field, comprising a controller, a second controller, a digital-to-analog converter, a current driver, and a bias coil. The first controller determines the position of the focal point of a lens and passes it to the second controller, which provides a digital signal related to the position. The digital-to-analog converter converts the digital signal to a driver voltage and passes the driver voltage to a current driver, which provides to the bias coil a bias current related to the driver voltage. The bias coil produces a magnetic field having a strength related to the bias current. The second controller accounts for stray magnetic fields in creating the digital signal. The stray magnetic fields may be constant or may vary in strength based on position of the objective lens, circumferential velocity of a circular storage medium, or longitudinal velocity of an elongated storage medium. Furthermore, the apparatus may comprise a current sensor for measuring the bias current, and a feedback device for providing to the current driver a feedback voltage related to the bias current.

There is also disclosed a method for controlling the strength of a magnetic field, comprising the steps of determining the position of a focal point of a lens, calculating a digital signal related to the position, generating a driver voltage related to the digital signal, generating a bias current related to the driver voltage, and producing a magnetic field having strength related to the bias current. The method accounts for stray magnetic fields in calculating the digital signal. The stray magnetic fields may be constant or may vary in strength based on position of the objective lens, circumferential velocity of the storage medium, or longitudinal velocity of the storage medium. Furthermore, the method may measure the bias current and provide to the current driver a feedback voltage related to the bias current.

DETAILED DESCRIPTION OF THE PREFERRED EMBODIMENT

Figure 1:
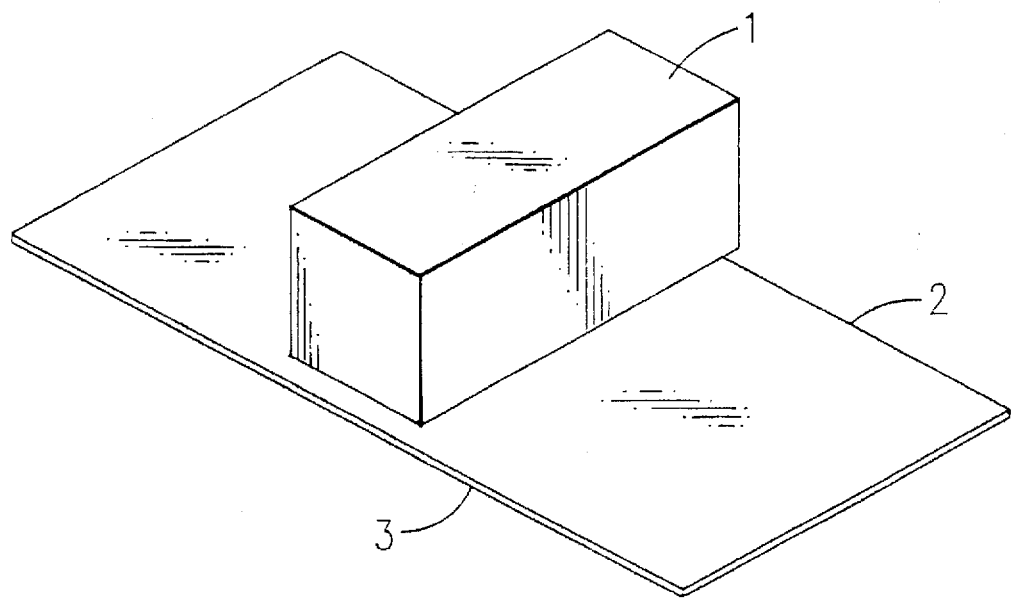
FIG. 1 is a general representation of a bias coil with an elongated storage medium.

Referring to exemplary FIG. 1, there is shown a general representation of a bias coil 1 with an elongated storage medium 2. The bias coil 1 extends from one edge 3 of the storage medium 2 across the width of the storage medium 2. An objective lens (not shown) is disposed on the opposite side of the storage medium 2 from the bias coil 1. The objective lens is movable parallel to the bias coil 1 across the entire width of the storage medium 2.

Whenever possible in the following description, elements in different figures which are the same are represented by the same element numbers.

Figure 2:
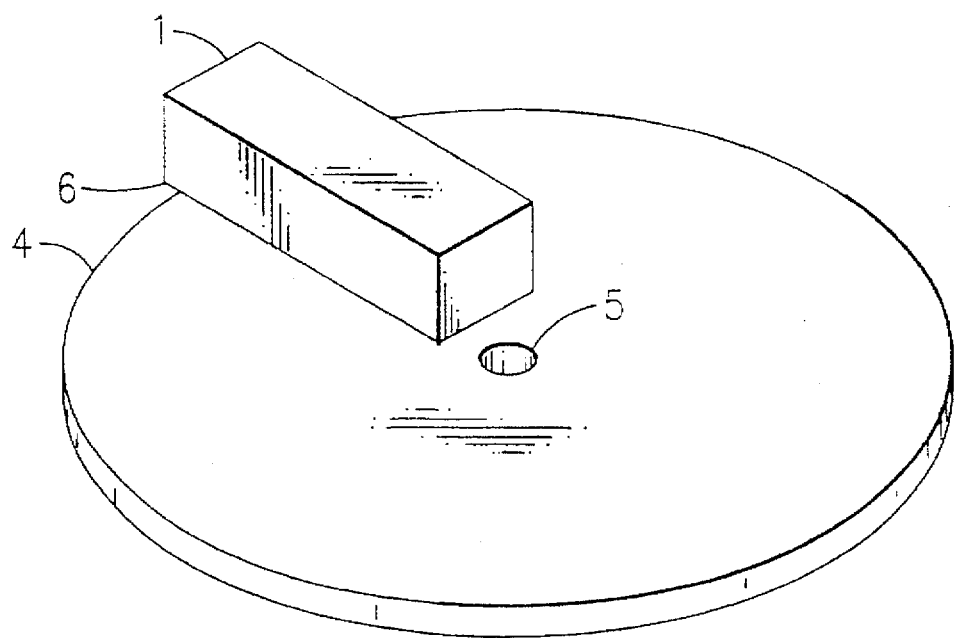
FIG. 2 is a general representation of a bias coil with a circular storage medium.

Referring to exemplary FIG. 2, there is shown a general representation of a bias coil 1 with a circular storage medium 4. The bias coil 1 extends from the center 5 of the storage medium 4 radially to the outer edge 6 of the storage medium 4. An objective lens (not shown) is disposed on the opposite side of the storage medium 4. The objective lens is movable parallel to the bias coil 1 from the center 5 to the outer edge 6 of the storage medium 4.

The bias coil 1 creates a magnetic field (not shown) on the surface of the storage media 2, 4 beneath the bias coil 1. Because the bias coil 1 is of finite length, the strength of the magnetic field (not shown) is not uniform across the length of the bias coil 1.

Figure 3:
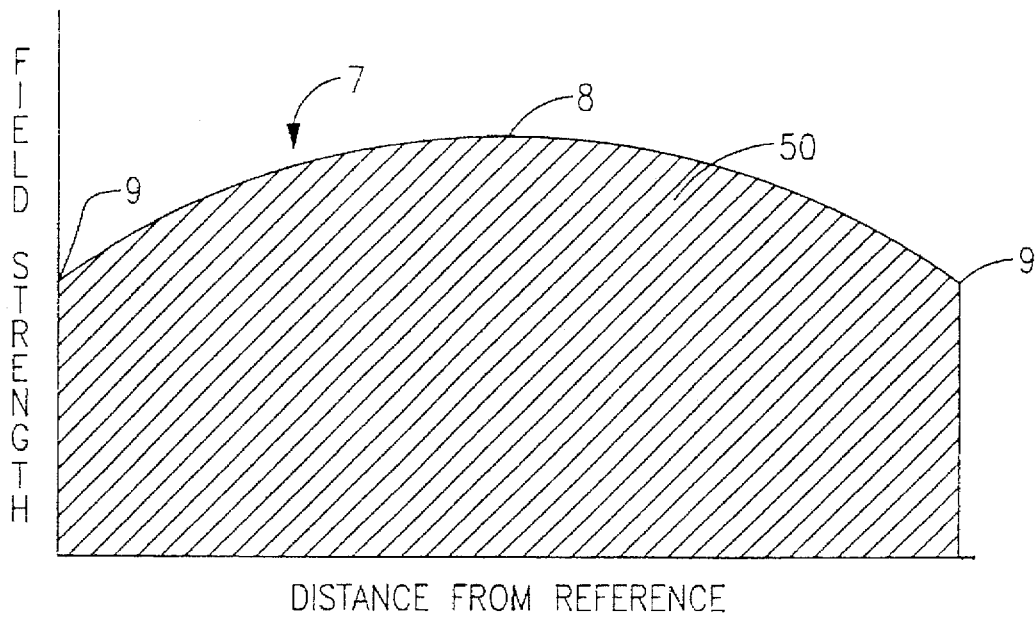
FIG. 3 is a general plot of the strength of a magnetic field from a bias coil on the surface of a storage medium, according to the prior art.

Referring to exemplary FIG. 3, there is shown a generalized plot of the strength of the magnetic field created by the bias coil 1 in prior art systems. The strength of the magnetic field is plotted along the vertical axis, and the position of the focal point of the objective lens is plotted along the horizontal axis as a distance from a reference point. The reference point may be either the edge 3 of the elongated storage medium 2, or the center 5 of the circular storage medium 4. Line 7 represents the strength of the magnetic field as a function of the distance from the reference point, for a constant current. The magnetic field is strongest at point 8, which corresponds either to the point halfway across the width of the elongated storage medium 2 or the midpoint between the center 5 and the outer edge 6 of the circular storage medium 4. The magnetic field is relatively weaker at points 9, which correspond to the points at the ends of the bias coil 1. The area 50 below line 7 represents the power required to maintain the magnetic field at the strength represented by line 7.

Figure 4:
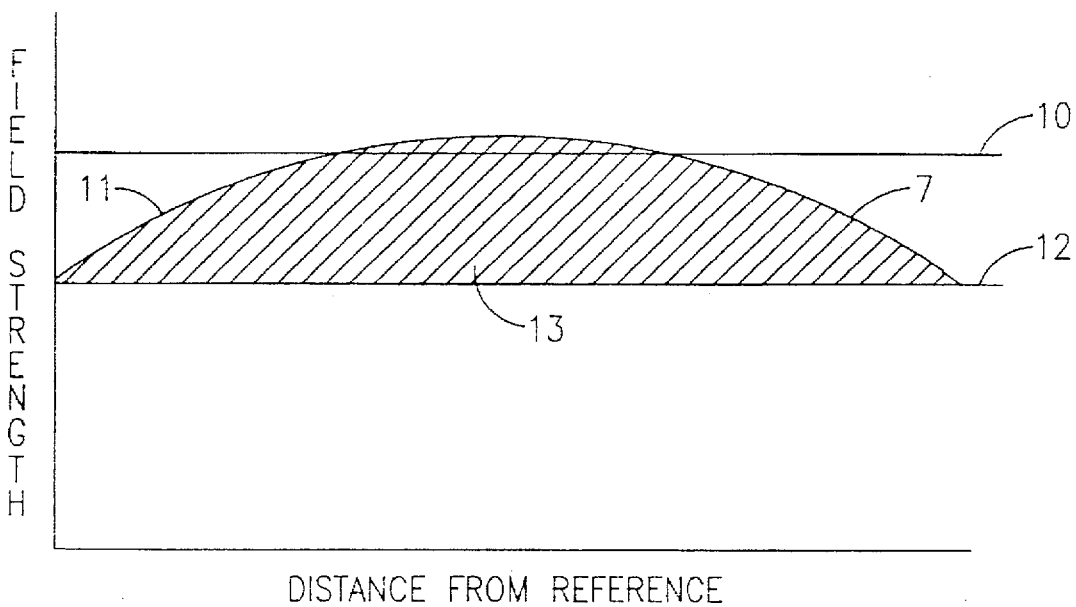
FIG. 4 is a general plot of the strength of a magnetic field from a bias coil on the surface of a storage medium, according to the prior art.

Referring to exemplary FIG. 4, there is shown a generalized plot of the strength of the magnetic field created by the bias coil I in prior art systems, as plotted in exemplary FIG. 3. In magneto-optical drives, a minimum strength of the magnetic field is required for writing or erasing data. One choice for the minimum strength is represented by line 10. Portions 11 of line 7 are below line 10. These portions 11 represent areas on the storage medium 2, 4 at which the strength of the magnetic field is insufficient to write or erase data.

Another choice for the minimum strength of the magnetic field is represented by line 12. Line 7 is above line 12 across the entire plot, representing that the strength of the magnetic field is sufficient to write or erase data at all points on the surface of the storage medium 2, 4. However, the area 13 which is above line 12 and below line 7 represents excess power consumption by the drive. Therefore, prior an systems either do not allow writing or erasing of data at all points on the surface of the storage medium 2, 4, or use excess power for points near the center of the bias coil 1.

Figure 5:
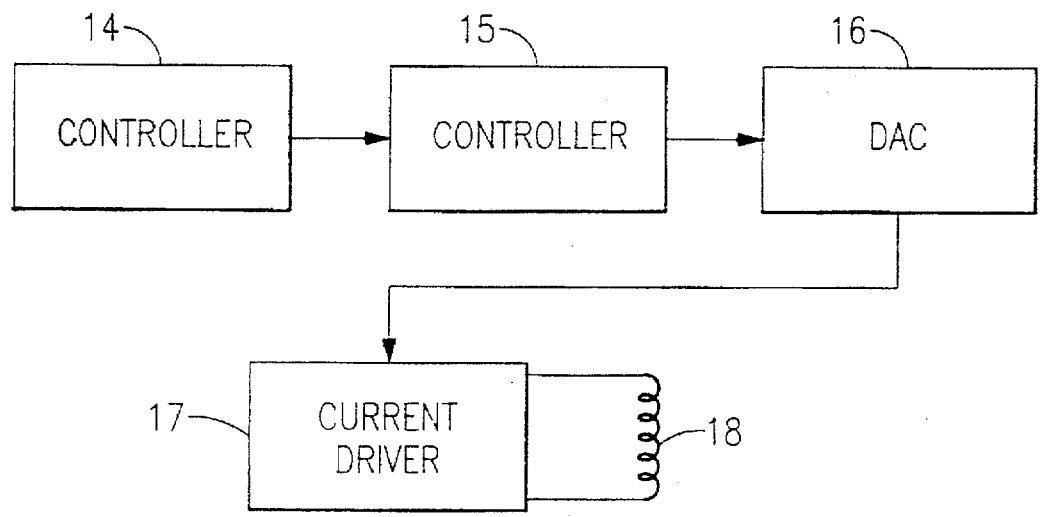
FIG. 5 is a generalized representation of one embodiment of the invention.

Referring to exemplary FIG. 5, there is shown a generalized representation of one embodiment of the invention. A first controller 14 measures the position of the focal point of the objective lens relative to a reference point. The reference point may be the edge 3 of an elongated storage medium 2, or the center 5 of a circular storage medium 4. The first controller 14 passes the position to a second controller 15. The second controller 15 creates a digital voltage signal relative to the position. The second controller 15 then passes the digital voltage signal to a digital-to-analog converter 16. The digital-to-analog converter 16 creates an analog driver voltage relative to the digital voltage signal. The digital-to-analog converter 16 then passes the analog driver voltage to a current driver 17. The current driver 17 creates a bias current relative to the analog driver voltage. The current driver 17 then passes the bias current to a bias coil 18. The bias coil 18 converts the bias current into a magnetic field. The strength of the magnetic field is related to the level of the bias current.

Figure 6:
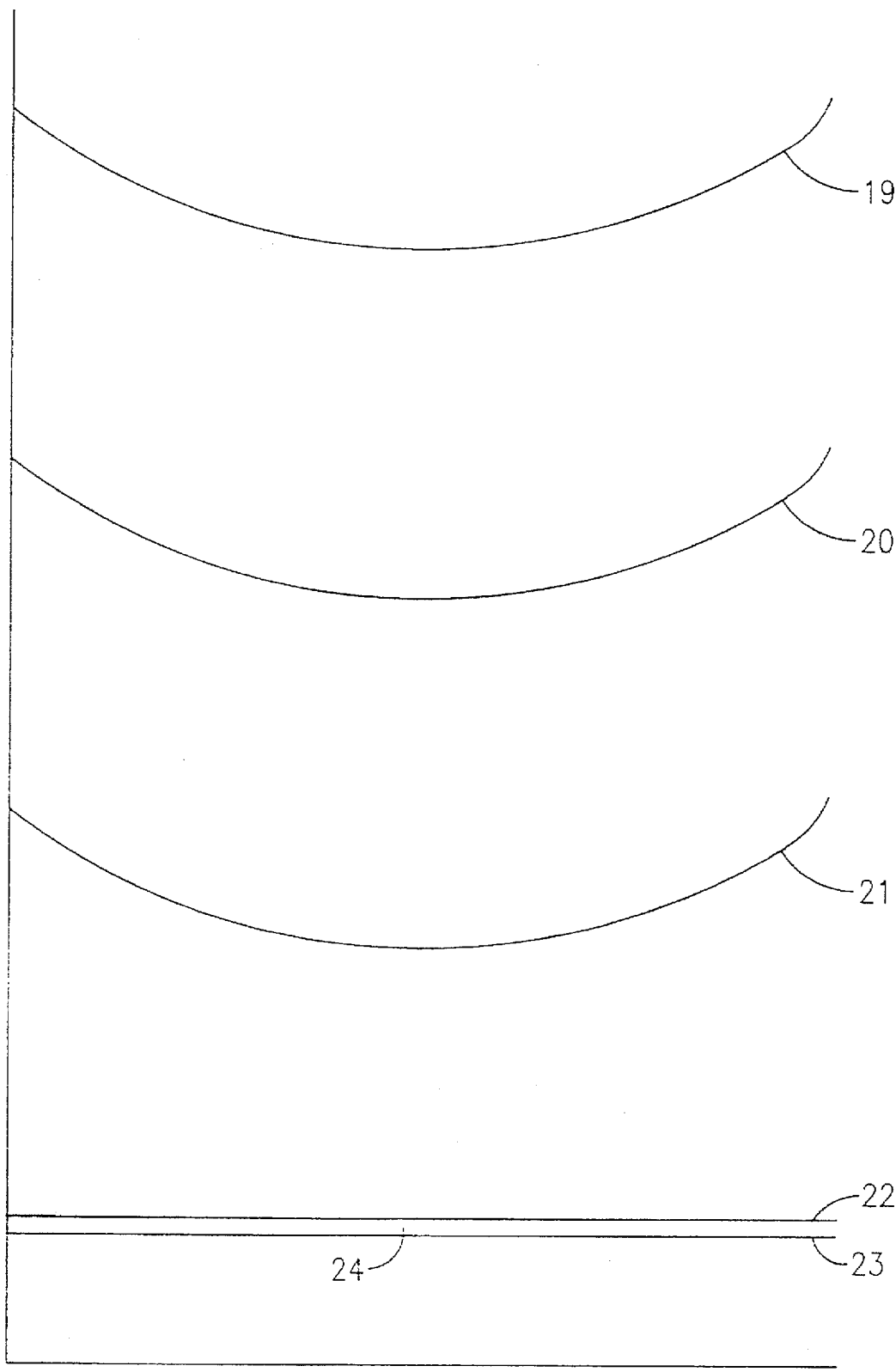
FIG. 6 is a generalized plot of the strength of a magnetic field from the invention on the surface of a storage medium and of minimum required magnetic field strength levels.

Referring to exemplary FIG. 6, there are shown four plots which represent levels of signals created according to the invention. Line 19 shows a plot representing the magnitude of the digital voltage signal as a function of the distance between the focal point of the objective lens and a reference point. Line 19 is plotted across the entire length of the bias coil 1, 18. Line 19 shows generally that the magnitude of the digital voltage signal decreases as the focal point nears the center of the bias coil 1, 18, and increases as the focal point nears the edges of the bias coil 1, 18.

Line 20 shows a plot representing the magnitude of the analog driver voltage as a function of the distance between the focal point of the objective lens and a reference point. Line 20 is plotted across the entire length of the bias coil 1, 18. Line 20 shows generally that the magnitude of the analog driver voltage decreases as the focal point nears the center of the bias coil 1, 18, and increases as the focal point nears the edges of the bias coil 1, 18.

Line 21 shows a plot representing the magnitude of the bias current as a function of the distance between the focal point of the objective lens and a reference point. Line 21 is plotted across the entire length of the bias coil 1, 18. Line 21 shows generally that the magnitude of the bias current decreases as the focal point nears the center of the bias coil 1, 18, and increases as the focal point nears the edges of the bias coil 1, 18.

Line 22 shows a plot representing the strength of the magnetic field created by the bias coil 1, 18, as a function of the distance between the focal point of the objective lens and a reference point. Line 22 is plotted across the entire length of the bias coil 1, 18. Line 22 shows generally that the strength of the magnetic field is independent of the position of the focal point.

Along with line 22, line 23 shows a plot line representing the minimum strength of the magnetic field required for writing or erasing data. Line 22 is above line 23 at all points in the plot, representing that the strength of the magnetic field is sufficient to write or erase data at all points on the surface of the storage medium 2, 4. Additionally, the area 24 between line 22 and line 23 representing excess power is minimized. The area 24 needs only to be large enough to handle variations in environmental conditions, media characteristics, and other factors affecting the minimum required strength of the magnetic field.

Figure 7:
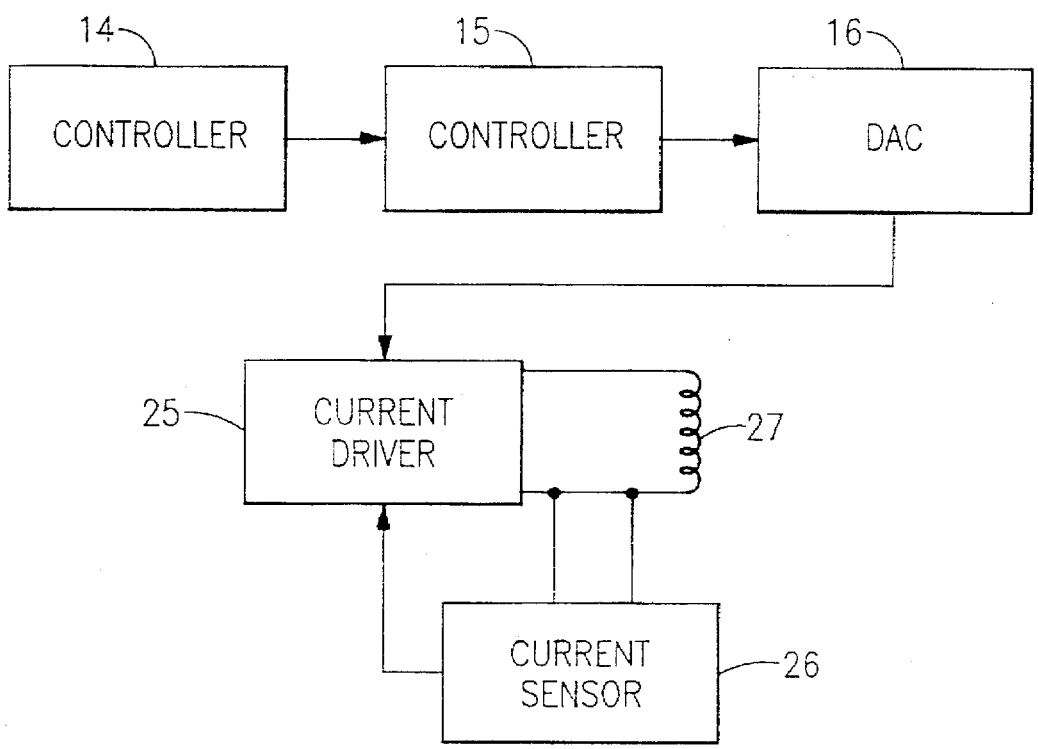
FIG. 7 is a generalized representation of another embodiment of the invention.

Referring to exemplary FIG. 7, there is shown another embodiment of the invention. The first controller 14, the second controller 15, and the digital-to-analog converter 16 function the same as in the previously-described embodiment. A current driver 25 receives as a first input the analog driver voltage. The current driver 25 receives as a second input a feedback driver voltage from a current sensor 26. The current driver 25 creates a bias current related to the analog driver voltage and the feedback driver voltage, and passes the bias current to a bias coil 27. The bias coil 27 creates a magnetic field whose strength is related to the bias current.

The current sensor 26 measures the bias current. The current sensor 26 compares the bias current to a desired minimum bias current which provides a magnetic field with the minimum required strength. Based on this comparison, the current sensor 26 creates the feedback driver voltage related to this comparison.

The second controller 15 provides the digital voltage signal for the invention. This may be accomplished by direct calculation during operation, by a lookup table created prior to operation, or by any suitable means known in the art. The calculation or lookup table may account not only for the magnetic field created by the bias coil 1, 18, 27, but also for magnetic fields created by other sources. Such magnetic fields are called stray magnetic fields.

Figure 8:
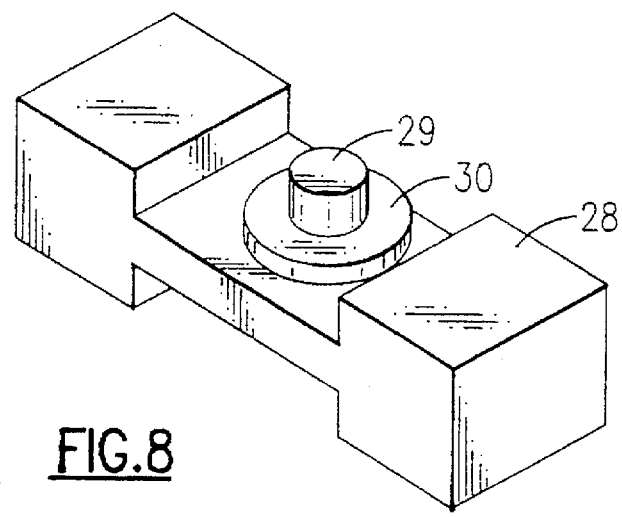
FIG. 8 is a generalized representation of a carriage assembly in a magneto-optical drive.

Stray magnetic fields may be classified into four types. First, some stray magnetic fields have constant strength at the focal point of the objective lens. Referring generally to exemplary FIG. 8, in a magneto-optical drive (not shown) a carriage assembly 28 may contain both an objective lens 29 and a focus actuator 30. The focus actuator 30 creates a stray magnetic field which has constant strength at the focal point of the objective lens 29. The strength of the stray magnetic field may be on the order of 30 poeksteds.

Figure 9:
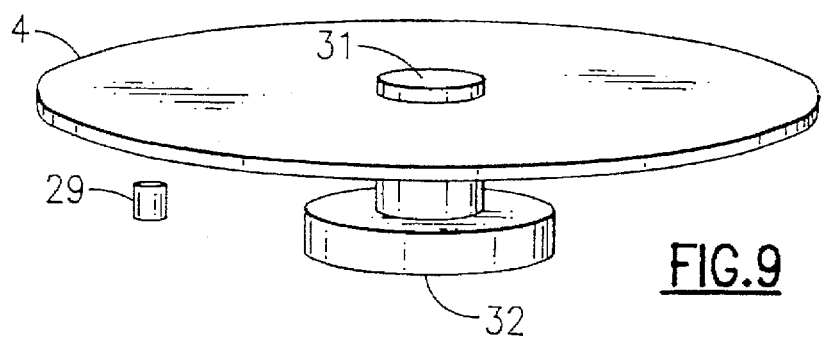
FIG. 9 is a generalized representation of a spindle motor, spindle, and storage medium.

Second, some stray magnetic fields have strength dependent on the distance from a reference point. Referring to exemplary FIG. 9, the circular storage medium 4 is clamped to a spindle 31. The spindle 31 is rotated by a spindle motor 32. The spindle motor 32 creates a stray magnetic field at the focal point of the objective lens 29. As the objective lens 29 moves radially outward relative to the storage medium 4, the strength of the stray magnetic field at the focal point of the objective lens 29 decreases.

Third, some stray magnetic fields have strength dependent on the rotational speed of the circular storage medium 4. Referring to exemplary FIG. 9, as the spindle motor 32 rotates the spindle 31 faster, the circular storage medium 4 rotates faster. At a given distance, the spindle motor 32 creates a stronger stray magnetic field at the focal point of the objective lens 29 when the circular storage medium 4 is rotating faster.

Figure 10:
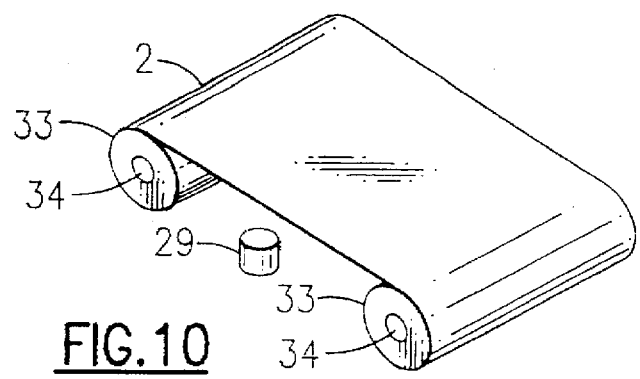
FIG. 10 is a generalized representation of spool motors and a storage medium.

Fourth, some sway magnetic fields have strength dependent on the longitudinal speed of the elongated storage medium 2. Referring to exemplary FIG. 10, the elongated storage medium 2 is taken up at each end on spools 33. The spools 33 are rotated by spool motors 34, each of which creates a stray magnetic field at the focal point of the objective lens 29. When the spool motors 34 rotate the spools 33 faster, the longitudinal speed of the storage medium 2 increases. The strength of the stray magnetic field at the focal point of the objective lens 29 also increases.

The calculation or lookup table may account for each of these types of stray magnetic fields when determining a digital voltage signal for a magnetic field strength. As an example, a typical magneto-optical drive may require a minimum magnetic field strength of 300 oresteds at the focal point of the objective lens 29. The focus actuator 30 may have a stray magnetic field strength on the order of 30 oersteds. The polarity of the magnetic field differs between writing and erasing. Therefore, in one operation, the stray magnetic field is additive and in the other operation the stray magnetic field is negative. Thus, the second controller 15 will be directed to create a digital voltage signal corresponding to, in one operation, 270 oersteds and, in the other operation, 330 oersteds.

Figure 11:
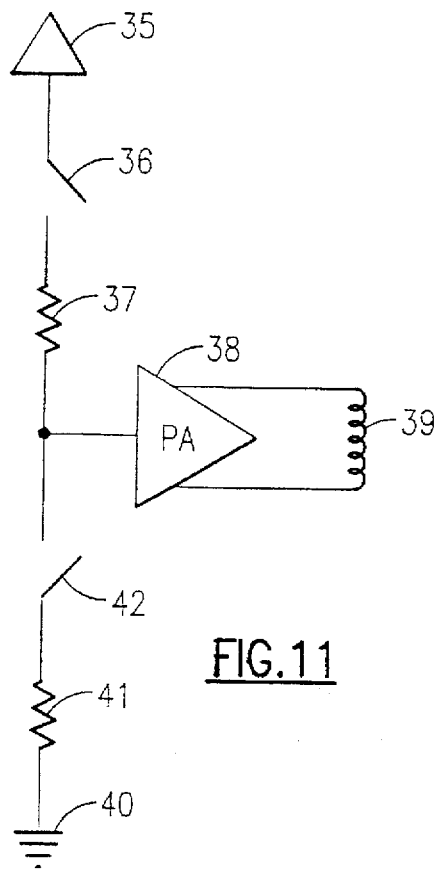
FIG. 11 is a circuit diagram of another embodiment of the invention.

Referring to exemplary FIG. 11, there is shown a circuit diagram of one embodiment of the invention. A voltage source 35 applies a voltage to a resistor 37. A switch 36 is located between the voltage source 35 and the resistor 37. When the switch 36 is closed, the current flowing through the resistor 37 flows into a power amplifier 38. The power amplifier 38 amplifies the current and outputs the current to a bias coil 39. The reference voltage of the power amplifier 38 is less than the voltage provided by the voltage source 35.

A ground 40 is connected to a resistor 41. A switch 42 is located on the opposite side of the resistor 41 as the ground 40, between the resistor 41 and the power amplifier 38. When the switch 42 is closed, current flows from the power amplifier 38 through the switch 42 and into the resistor 41. The reference voltage of the power amplifier 38 is greater than the voltage from the ground 40. Exactly one of the switches 36, 42 is closed at any time. Therefore, when the switch 42 is closed, the bias coil 39 creates a magnetic field with the opposite polarity as the magnetic field created when the switch 36 is closed.

In prior systems, the current flowing into the power amplifier 38 is the same magnitude when the switch 36 is closed as the current flowing from the power amplifier 38 when the switch 42 is closed. However, some stray magnetic fields have both constant magnitude and constant polarity. In some embodiments, a magnetic field strength from the bias coil 39 having a magnitude of 300 oersteds is required for both writing and erasing data. A stray field magnetic field strength of approximately 30 oersteds is typical. Therefore, in order to ensure a minimum field strength of 300 oersteds the current through the power amplifier 38 must be sufficient to provide a bias field strength of 330 oersteds. In one operation, the resulting magnetic field strength will be 300 oersteds, and in the other operation, the resulting magnetic field strength will be 360 oersteds. A resulting magnetic field strength of 360 oersteds is excessive, and consumes excess power.

According to the invention, the current through the power amplifier 38 differs depending on whether the stray field is additive or negative with respect to the magnetic field created by the bias coil. In one embodiment, the resistors 37, 41 have different resistance. In another embodiment, the reference voltage of the power amplifier 38 is not halfway between the voltage supplied by the voltage source 35 and the ground 40. Either of these embodiments minimize excess power consumption by making the resulting magnetic field strength equal to the minimum magnetic field strength, within tolerances, for either writing or erasing data.

Figure 12:
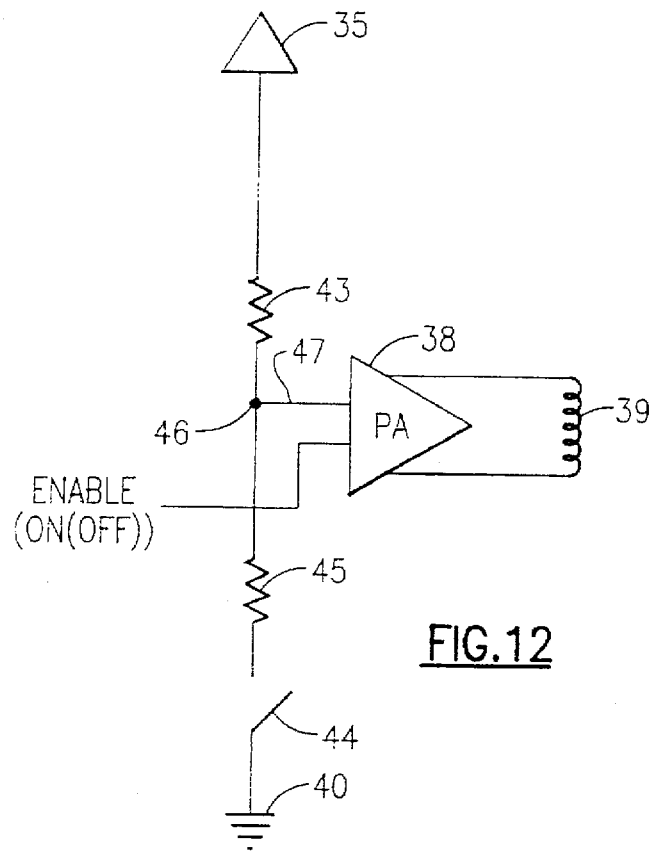
FIG. 12 is a circuit diagram of a further embodiment of the invention.

Referring to exemplary FIG. 12, there is shown a circuit diagram of another embodiment of the invention. A voltage source 35 is connected to a resistor 43, which is connected to a power amplifier 38 by a line 47. The current flowing from the voltage source 35-resistor 43 combination is amplified by the power amplifier 38 and flows through a bias coil 39, which creates a bias magnetic field. The reference voltage of the power amplifier 38 is less than the voltage supplied by the voltage source.

A ground 40 is connected to a switch 44, which in turn is connected to a resistor 45. At a point 46 on the side of the resistor 45 remote from the switch 44, connection is made to line 47. When the switch 44 is open, a positive current flows into the power amplifier 38, and a positive magnetic field is created by the bias coil 39. When the switch 44 is closed, a negative current flows into the power amplifier 38, and a negative magnetic field is created by the bias coil 39.

In prior art systems, the resistance of the resistor 43 was twice the resistance of resistor 45, and the reference voltage of the power amplifier 38 was halfway between the voltage of the voltage source 35 and the ground 40. Because of this, the bias magnetic field strength has the same magnitude but opposite polarity when the switch 44 is closed as when it is open. However, because of the constancy of the stray field, the resulting magnetic field strength for one operation differs from the resulting magnetic field strength for the other operation by the amount of twice the stray field magnetic field strength.

To compensate for the stray field, one of three approaches may be taken. First, the reference voltage of the power amplifier 38 may be changed so that it is not halfway between the voltage of the voltage source 35 and the ground 40. Second, the voltage of the voltage source 35 may be changed so that the reference voltage of the power amplifier 38 is not halfway between the voltage of the voltage source 35 and the ground 40. Finally, the resistances of the resistors 43, 45 may be changed so that the resistance of resistor 43 is not twice the resistance of resistor 45.

In any of the embodiments discussed with respect to exemplary FIGS. 11 and 12, the ground 40 may be replaced by a second voltage source. The reference voltage of the power amplifier 38 must be greater than the voltage output of the second voltage source.

It will be obvious to one skilled in the art that modifications to the above description of the invention may be made without departing from the spirit and scope of the invention. The scope of the invention, therefore, is indicated by the appended claims rather than the above description.

What is claimed is:

1. An apparatus for controlling a magnetic field strength of bias coil at a focal point of a lens during recording on a medium, said apparatus comprising:
   a first controller for determining a distance between said focal point and a reference point on said medium, said first controller outputting said distance;
   a source generating a stray magnetic field having a stray field strength at said focal point;
   a second controller responsive to said distance for outputting a digital signal, said digital signal being a function of said distance and said stray field strength;
   a digital-to-analog converter responsive to said digital signal for providing a driver voltage;
   a current driver responsive to said driver voltage for providing a bias current to said bias coil wherein said magnetic field strength is controlled at a predetermined value;
   a current sensor for measuring said bias current; and
   a feedback device responsive to said current sensor for providing to said current driver a feedback voltage wherein said feedback voltage is a function of said bias current and a desired minimum bias current.

2. The apparatus according to claim 1 wherein said medium is in the form of an optical disk and said reference point is the center of the disk.

3. The apparatus according to claim 1 wherein said stray field strength is a function of said distance.

4. The apparatus according to claim 1 wherein said medium rotates about said reference point and said stray field strength is a function of the rotational velocity.

5. A method for controlling a magnetic field strength of a bias coil at a focal point of a lens during recording on a medium, said method comprising the steps of:
   determining a distance between said focal point and a reference point on said medium;
   generating a stray magnetic field having a stray field strength at said focal point;
   calculating a digital signal, said digital signal being a function of said distance and said stray field strength;
   converting said digital signal to a driver voltage;
   applying said driver voltage to a current driver for providing a bias current to said bias coil wherein said magnetic field strength is controlled at a predetermined value;
   measuring said bias current; and
   processing said measurement for providing to said current driver a feedback voltage wherein said feedback voltage is a function of said bias current and a desired minimum bias current.

6. The method according to claim 5 wherein said medium is in the form of an optical disk and said reference point is the center of the disk.

7. The method according to claim 5 wherein said stray field strength is a function of said distance.

8. The method according to claim 6 further including the step of: rotating said medium about said reference point, wherein said stray field strength is a function of the rotational velocity.

* * * * *